United States Patent [19]
Hosseini et al.

[11] Patent Number: 5,950,789
[45] Date of Patent: Sep. 14, 1999

[54] END OF FILL DETECTOR FOR A FLUID ACTUATED CLUTCH

[75] Inventors: Javad Hosseini, Edelstein; Kendall R. Harrell, Morton; Alan L. Stahl, Peoria, all of Ill.

[73] Assignee: Caterpillar Inc., Peoria, Ill.

[21] Appl. No.: 09/066,969

[22] Filed: Apr. 27, 1998

[51] Int. Cl.⁶ .................................................. F16D 48/06
[52] U.S. Cl. .................................... 192/85 R; 192/109 F
[58] Field of Search .............................. 192/85 R, 109 F, 192/103 F, 3.3, 3.31, 3.29, 3.58; 74/733.1

[56] References Cited

U.S. PATENT DOCUMENTS

| | | | |
|---|---|---|---|
| 3,956,947 | 5/1976 | Leising et al. | 74/866 |
| 4,208,929 | 6/1980 | Heino et al. | 74/731 |
| 4,414,863 | 11/1983 | Heino | 74/866 |
| 4,419,909 | 12/1983 | Opperud et al. | 74/856 |
| 4,653,350 | 3/1987 | Downs et al. | 74/864 |
| 4,707,789 | 11/1987 | Downs et al. | 364/424.1 |
| 4,724,939 | 2/1988 | Lockhart et al. | 192/3.3 |
| 4,790,418 | 12/1988 | Brown et al. | 192/0.032 |
| 4,796,490 | 1/1989 | Butts et al. | 74/866 |
| 4,836,057 | 6/1989 | Asayama et al. | 74/867 |
| 4,838,124 | 6/1989 | Hamano et al. | 74/866 |
| 4,841,815 | 6/1989 | Takahashi | 74/866 |
| 4,843,902 | 7/1989 | Patton et al. | 74/335 |
| 4,854,194 | 8/1989 | Kaneko et al. | 74/866 |
| 4,855,913 | 8/1989 | Brekkestran et al. | 364/414.1 |
| 4,875,391 | 10/1989 | Leising et al. | 74/866 |
| 4,953,679 | 9/1990 | Okino | 192/0.096 |
| 4,955,256 | 9/1990 | Kashihara et al. | 74/866 |
| 4,967,385 | 10/1990 | Brekkestran et al. | 364/571.03 |
| 4,967,611 | 11/1990 | Sugano | 74/868 |
| 4,967,620 | 11/1990 | Shimanaka | 74/866 |
| 4,968,999 | 11/1990 | Fodale et al. | 364/424.1 |
| 4,969,098 | 11/1990 | Leising et al. | 364/414.1 |
| 4,975,845 | 12/1990 | Mehta | 364/424.3 |
| 4,981,053 | 1/1991 | Yamaguchi | 74/866 |
| 4,982,620 | 1/1991 | Holbrook et al. | 74/731.1 |
| 4,989,470 | 2/1991 | Bulgrien | 74/335 |
| 4,991,455 | 2/1991 | Bulgrien | 74/336 |
| 5,004,084 | 4/1991 | Mehr-Aiyn et al. | 192/0.033 |

(List continued on next page.)

FOREIGN PATENT DOCUMENTS

| | | |
|---|---|---|
| 0357184A1 | 3/1990 | European Pat. Off. . |
| 0196358B1 | 5/1990 | European Pat. Off. ........ F16H 61/06 |
| 0372073B1 | 6/1990 | European Pat. Off. . |
| 0435372A2 | 3/1991 | European Pat. Off. . |
| 0435375A2 | 3/1991 | European Pat. Off. . |
| 0435377A2 | 3/1991 | European Pat. Off. . |
| 0435375A3 | 7/1991 | European Pat. Off. ........ F16H 61/06 |
| 0435377A3 | 7/1991 | European Pat. Off. . |
| 3407716 | 3/1985 | Germany ....................... G01B 21/02 |
| 4017961 | 12/1990 | Germany ....................... B60K 41/10 |
| 2212971 | 8/1989 | United Kingdom . |
| WO9102913 | 3/1991 | WIPO ........................... F16H 61/06 |

OTHER PUBLICATIONS

Article from Off–Highway Engineering Magazine dated Apr. 1993 entitled Transmission Control System for Bulldozers.

Article No. 820392 entitled "Electronic Control of Automobile Transmissions" by G. Pannier and A. Laport.

Article No. 820394 entitled "Microcomputer Controlled Automatic Transmission" by Alan L. Miller.

Article No. 830880 entitled "Development of NISSAN Microprocessor Controlled Four Speed Lockup Automatic Transmission" by I. Suga et al.

(List continued on next page.)

*Primary Examiner*—Charles A. Marmor
*Assistant Examiner*—Saul J. Rodriguer
*Attorney, Agent, or Firm*—Kevin M. Kercher

[57] ABSTRACT

In one aspect of this invention, a fluid actuated clutch is disclosed. The fluid actuated clutch is operatively connected to a control valve that is activated by an electronic controller that receives a signal from an input mechanism. The system and method includes detecting an instantaneous clutch slip and detecting when the instantaneous clutch slip is less than an average of a predetermined number of cycles of instantaneous clutch slip that is divided by a predetermined factor. This condition represents the end-of-fill point for the fluid actuated clutch.

20 Claims, 4 Drawing Sheets

U.S. PATENT DOCUMENTS

| | | | |
|---|---|---|---|
| 5,005,441 | 4/1991 | Narita | 74/866 |
| 5,005,444 | 4/1991 | Kimura et al. | 74/868 |
| 5,005,680 | 4/1991 | Satoh et al. | 192/3.55 |
| 5,007,308 | 4/1991 | Narita | 74/866 |
| 5,014,573 | 5/1991 | Hunter et al. | 74/866 |
| 5,014,575 | 5/1991 | Fujiwara et al. | 74/866 |
| 5,016,175 | 5/1991 | Baltusis et al. | 364/424.1 |
| 5,018,408 | 5/1991 | Bota et al. | 74/866 |
| 5,029,086 | 7/1991 | Yoshimura | 364/424.1 |
| 5,029,492 | 7/1991 | Kiuchi | 74/844 |
| 5,029,494 | 7/1991 | Lentz et al. | 84/866 |
| 5,033,328 | 7/1991 | Shimanaka | 74/866 |
| 5,035,312 | 7/1991 | Asayama et al. | 192/85 |
| 5,036,718 | 8/1991 | Bulgrien | 74/335 |
| 5,036,730 | 8/1991 | Sakai et al. | 74/866 |
| 5,038,286 | 8/1991 | Asayama et al. | 364/866 |
| 5,038,636 | 8/1991 | Vukovich et al. | 74/866 |
| 5,046,174 | 9/1991 | Lentz et al. | 374/414.1 |
| 5,046,175 | 9/1991 | Lentz et al. | 364/424.1 |
| 5,046,176 | 9/1991 | Lin | 364/424.1 |
| 5,046,178 | 9/1991 | Hibner et al. | 364/414.1 |
| 5,050,456 | 9/1991 | Fukunda | 74/866 |
| 5,050,458 | 9/1991 | Vukovich et al. | 74/866 |
| 5,052,246 | 10/1991 | Yamaguchi | 74/866 |
| 5,053,960 | 10/1991 | Brekkestran et al. | 364/414.1 |
| 5,054,599 | 10/1991 | Marcott | 192/85 |
| 5,056,639 | 10/1991 | Petzold et al. | 192/0.076 |
| 5,058,460 | 10/1991 | HIbner et al. | 74/867 |
| 5,063,813 | 11/1991 | Lentz | 74/866 |
| 5,067,084 | 11/1991 | Kau | 364/453 |
| 5,067,373 | 11/1991 | Kyohzuka et al. | 74/866 |
| 5,067,374 | 11/1991 | Sakai eta al. | 74/866 |
| 5,069,084 | 12/1991 | Matsumo et al. | 74/844 |
| 5,070,747 | 12/1991 | Lentz et al. | 74/866 |
| 5,072,390 | 12/1991 | Lentz et al. | 364/424.1 |
| 5,085,105 | 2/1992 | Wakahara et al. | 74/866 |
| 5,101,943 | 4/1992 | Bulgrien | 192/3.63 |
| 5,108,408 | 4/1992 | Bota et al. | 74/866 |
| 5,113,720 | 5/1992 | Asayama et al. | 74/866 |
| 5,119,697 | 6/1992 | Vukovich et al. | 74/867 |
| 5,154,099 | 10/1992 | Asatuke et al. | 74/867 |
| 5,163,342 | 11/1992 | Pollack et al. | 74/866 |
| 5,169,973 | 12/1992 | Asayama et al. | 192/85 |
| 5,174,137 | 12/1992 | Kato et al. | 73/118.1 |
| 5,188,005 | 2/1993 | Sankpal et al. | 74/866 |
| 5,190,130 | 3/1993 | Thomas et al. | 192/0.032 |
| 5,209,141 | 5/1993 | Asayama et al. | 74/866 |
| 5,211,079 | 5/1993 | Runde et al. | 74/866 |
| 5,216,606 | 6/1993 | Lentz et al. | 364/424.1 |
| 5,224,577 | 7/1993 | Falck et al. | 192/0.092 |
| 5,251,509 | 10/1993 | Pollack et al. | 74/861 |
| 5,289,741 | 3/1994 | Debs et al. | 74/866 |
| 5,311,795 | 5/1994 | Yoshimura et al. | 74/867 |
| 5,403,248 | 4/1995 | Ando et al. | 477/130 |
| 5,467,854 | 11/1995 | Creger et al. | 192/87.18 |
| 5,468,198 | 11/1995 | Holbrook et al. | 477/143 |
| 5,472,389 | 12/1995 | Ando et al. | 477/130 |
| 5,580,332 | 12/1996 | Mitchell et al. | 477/143 |

OTHER PUBLICATIONS

Article No. 840448 entitled "Electronic Control of a 4–Speed Automatic Transmission with Lock–Up Clutch" by M. Schwab.

Article No. 901154 "Trends of Powertrain Control" by N. Narumi, H. Suzuki, R. Sakakiyama.

Article No. 901154 entitled "Trends of Powertrain Control" by N. Narumi et al.

Article No. 901156 entitled "Electronically–Controlled Transmission Systems — Current Position and Future Developments" by M. Schwab.

Article No. 901157 entitled "Advanced Controls for Heavy Duty Transmissions Applications" by J. Bender and K. Struthers.

Article No. 901160 entitled "Powertrain Electronics— Progress on the Use and Development of the Computer Aided Gearshift Systems" by Brader.

Komatsu Technical Guide entitled "K–Atomics — Komatsu–Advanced Transmission with Optimum Modulation Control".

SAE Article No. 861050 entitled "Electronically Controlled Mechanical Automatic Transmission for Heavy Duty Trucks & Busses" by S. Tanaka.

SAE Article No. 890528 entitled "The Chrysler A–604 Ultradrive 4–Speed Automatic Transaxle" by B. Martin and T. Nogle.

SAE Article No. 890529 entitled "The All–Adaptive Controls for the Chrysler Ultradrive Transaxle" by M. Leisin, H. Benford, G. Holbrook.

SAE Technical Paper No. 861170 entitled "Digital Electronic Controls for Detroit Diesel Allision Heavy Hauling Transmissions" by R.C. Boyer.

SAE Technical Paper No. 861212 entitled "The Design and Development of a Four Speed Powershift Transmission . . . " by J.E. Goodbar et al.

SAE Technical Paper No. 880480 entitled "Borg–Warner Australia Model 85 Augomatic Transmission" by E. Wilfinger and J. Thompson.

SAE Technical Paper No. 892000 entitled "A Study on Electro–Hydraulic Control for Automatic Transmission" by K Hasunaka et al.

SAE Technical Paper No. 900550 entitled "Toyota "ECT–i" a New Automatic Transmission with Intelligent . . . " by T. Kondo et al.

SAE Technical Paper No. 901557 entitled "A Transmission Control System for Construction Machinery" by K. Kusaka and Y. Ohkura.

SAE Technical Paper No. 901592 entitled "Adaptive Electronic Tractor Shift Control System" by L. Ross and D. Panoushek.

SAE Technical Paper No. 910082 entitled "An Engine & Transmission Control system w/New 16–bit Single chip . . . " by S. Kuroanagi et al.

SAE Technical Paper No. 910410 entitled "SCTV — A State of the Art Electronically Controlled Continuously Variable . . . " by S. Hirano et al.

SAE Technical Paper No. 910639 entitled "Analysis of a New Automatic Transmission Control System for LEXUS LS400" by H. Taniguchi et al.

SAE Technical Paper No. 911831 entitled "User–Friendly Electronic Powershift Transmission Controls" by G. Bulgrien.

SAE Technical Paper No. 911880 entitled "New Kubota Midsize Farm Tractor" by Shinohara et al.

SAE Technical Paper No. 911938 entitled "Improving Automatic Transmission Shift Quality by Feedback Control . . . " by Y. Narita.

SAE Technical Paper No.910750 entitled "Diesel Deposit Forming Tendencies — Microanalysis Methods" by J. Perez et al.

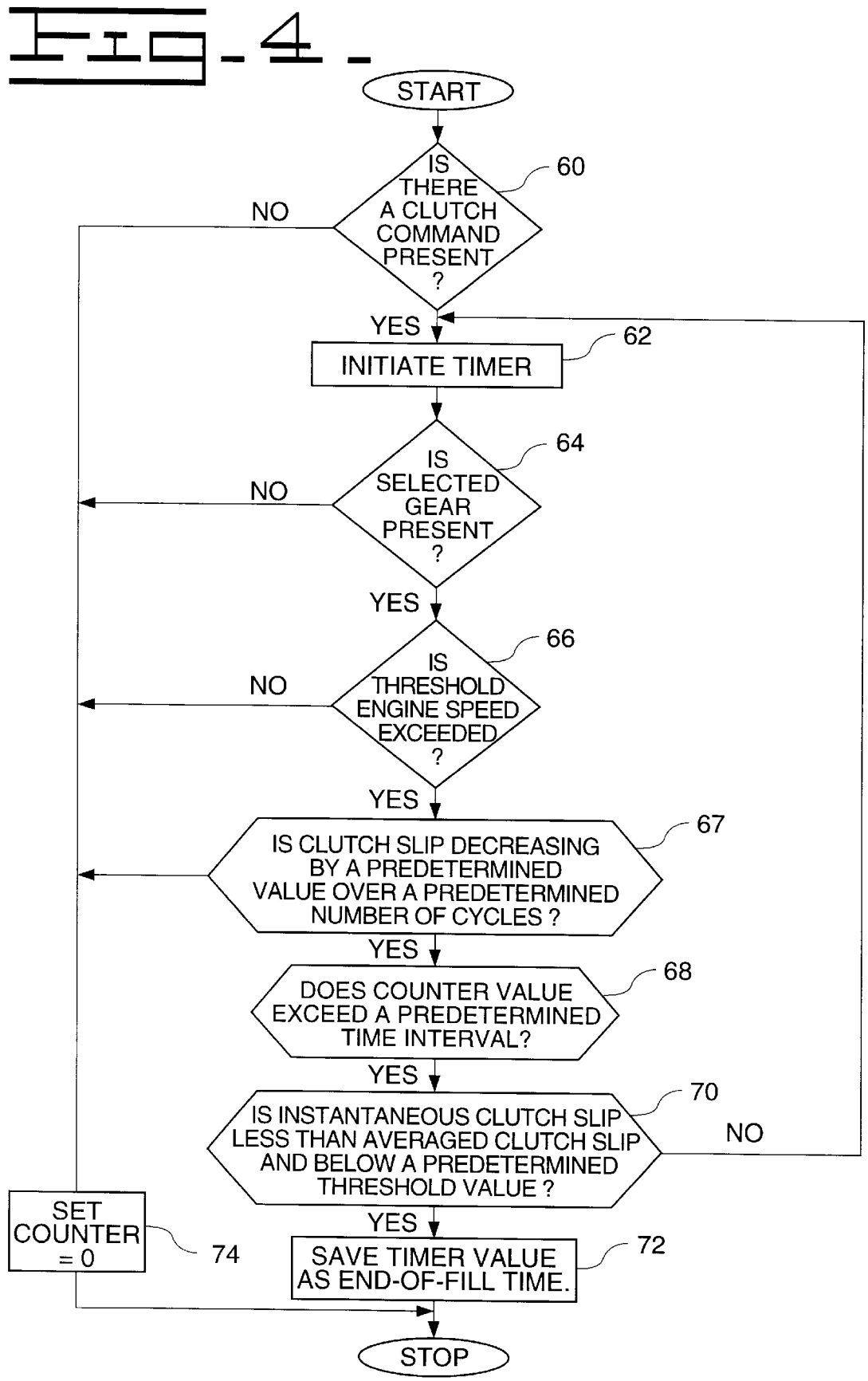

END OF FILL DETECTOR FOR A FLUID ACTUATED CLUTCH

TECHNICAL FIELD

This invention relates generally to a method of clutch control and, more particularly, to a method of determining the end-of-fill point for a fluid actuated clutch.

BACKGROUND ART

In general, the output shaft of an engine is typically connected to an input shaft of a torque converter and an output shaft of a torque converter is typically connected to an input shaft of a transmission. The lock-up clutch is located between the input shaft and output shaft of a torque converter so as to provide a rotatable connection. An electronic control system is typically utilized to smoothly engage and disengage a fluid actuated clutch. The clutch is interfaced to an associated solenoid valve through the electronic control system. The solenoid valve is modulated to control the clutch pressure in response to command signals from the electronic control system.

To precisely time the engagement of the clutch, the fill time is an important parameter. Fill time is defined as the time required to fill an on-coming clutch cavity with fluid. During this fill period, a clutch piston will stroke and clutch plates will move to the point of "touch-up". However, until the clutch plates are compressed together, the clutch cannot transmit any significant torque. Therefore, the end-of-fill time is important to ascertain when this critical moment is reached. A harsh engagement can result in a torque spike that is transmitted through the drivetrain of the machine and creates a "jerk". This jerk is uncomfortable to the operator and diminishes the life expectancy of the associated drivetrain components of the machine.

One known arrangement utilizes a separate flow sensing valve having an electrical switch disposed thereon. The flow into the flow sensing valve is directed through a fixed orifice to the associated hydraulic clutch. Once the flow through the valve ceases, the absence of a pressure drop across the fixed orifice permits the flow sensing valve to return to a spring biased, flow blocking position. Once the flow sensing valve is in the spring biased position, this triggers an electrical switch that indicates that the clutch is filled. A major drawback with this arrangement is that it requires all fluid to flow through a fixed orifice and also through a separate flow sensing switch for each clutch in the system.

Still another known mechanism for determining end-of-fill is to control the amount of time that fluid is allowed to flow toward the clutch. These arrangements do not account for variances in control valves or clutch activating chambers. To overcome these variances, a number of control schemes have been devised to adaptively change the fill time based on previous clutch fills. However, these control schemes depend on costly and time consuming calibration techniques.

Yet another technique for determining the end-of-fill point involves monitoring the electronic activation of the control valve that directs fluid to the clutch. When the actuating chamber of the clutch is full, the increase in pressure operates upon the control valve to move it back to a flow blocking position. The force that is acting to move the control valve back to the flow blocking position is acting against the electrical force that moved the control valve to the flow passing position. This creates an electrical voltage spike that is detected by an electronic controller. This voltage spike represents the end-of-fill point. A drawback with this technique is that a separate control scheme is required for each clutch control valve.

The present invention is directed to overcoming one or more of the problems set forth above.

DISCLOSURE OF THE INVENTION

In one aspect of this invention, a fluid actuated clutch is disclosed. The fluid actuated clutch is operatively connected to a control valve that is activated by an electronic controller that receives a signal from an input mechanism. The system and method includes detecting an instantaneous clutch slip and detecting when the instantaneous clutch slip is less than an average of a predetermined number of cycles of instantaneous clutch slip that is divided by a predetermined factor. This condition represents the end-of-fill point for the fluid actuated clutch.

BRIEF DESCRIPTION OF THE DRAWINGS

For a better understanding of the present invention, reference may be made to the accompanying drawings in which:

FIG. 4 is a flowchart illustrating software for determining the end-of-fill point for a fluid actuated clutch.

BEST MODE FOR CARRYING OUT THE INVENTION

Figure 1:
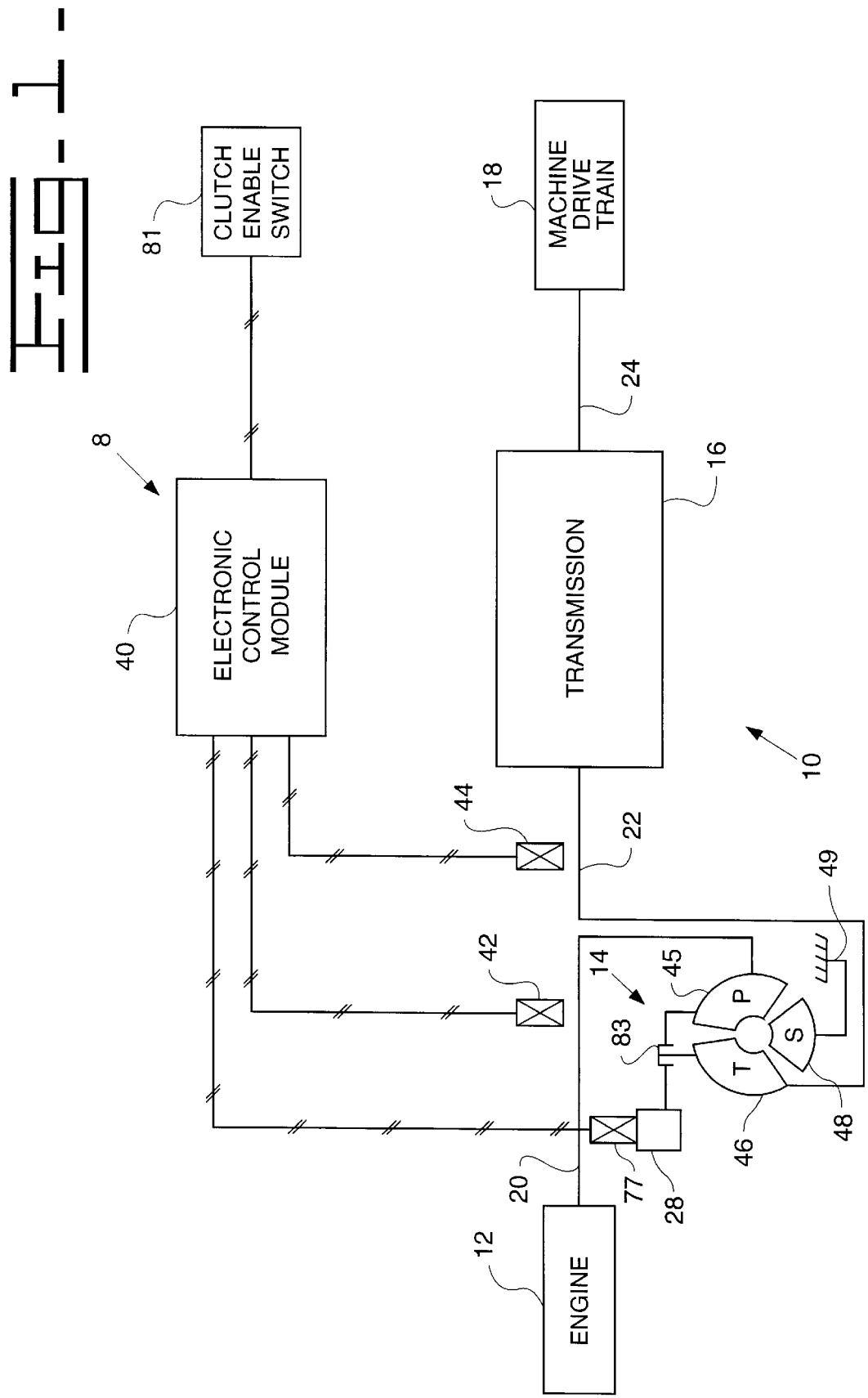
FIG. 1 is a block diagram of an electronic control system of a machine including an engine, drivetrain, transmission, torque converter and a fluid actuated clutch.

Referring now to the drawings, and initially to FIG. 1, an electronic control system 8 of a power train 10 is depicted that includes an internal combustion engine 12, a fluidic torque converter 14, a multi-speed fluid operated power transmission 16, and a machine drivetrain 18. The engine 12 is connected to the torque converter 14 by a first shaft 20, the torque converter 14 is connected to the transmission 16 by a second shaft 22, and the transmission 16 is connected to the machine drivetrain 18 by a third shaft 24. The shafts 20, 22, and 24 can be eliminated with the combustion engine 12, the fluidic torque converter 14, and the multi-speed fluid operated power transmission 16 being directly connected together. This type of interconnection would depend on the type of machine. The torque converter 14 includes an impeller 45 coupled to the first shaft 20, a turbine member 46 coupled to the second shaft 22, and a stator member 48 that may be grounded to a housing 49 for the torque converter 14.

The control portion of the drivetrain will now be discussed. An operator produces a desired engagement of a fluid actuated clutch 83 through the activation of a clutch enable switch 81. The clutch enable switch 81 is optional and not always necessary for activation of the fluid actuated clutch 83. An electronic control module 40 receives the clutch enable signal and then controls the operation of a solenoid control valve 77. The electronic control system also receives various other inputs representing machine system parameters. These other inputs include an engine speed signal from an engine speed sensor 42 and a torque converter output signal from a torque converter output sensor 44. The clutch slip is defined as the difference between the input speed and the output speed of the clutch. For a lock-up clutch it is defined as the difference between the engine speed and the torque converter output speed.

The engine speed sensor 42 and the torque converter output sensor 44 are preferably conventional electrical transducers. A typical, but nonlimiting example of a conventional electrical transducer would be a magnetic speed pickup. However, numerous other types and methods of speed sensing may be utilized.

The electronic control module 40 delivers a clutch command signal that is proportional to the desired current needed to operate the solenoid control valve 77. In the preferred embodiment, the current driver utilizes a pulse width modulated voltage to produce the desired current. The solenoid control valve 77 is configured to maintain communication of oil to a proportional control valve 28, that is sufficient to maintain a clutch pressure that is proportional to the solenoid current once the clutch 83 is filled. Therefore, the electronic control module 40 controls the clutch pressure by means of a proportional command signal provided to the solenoid control valve 77 that operates the clutch 83.

Figure 2:
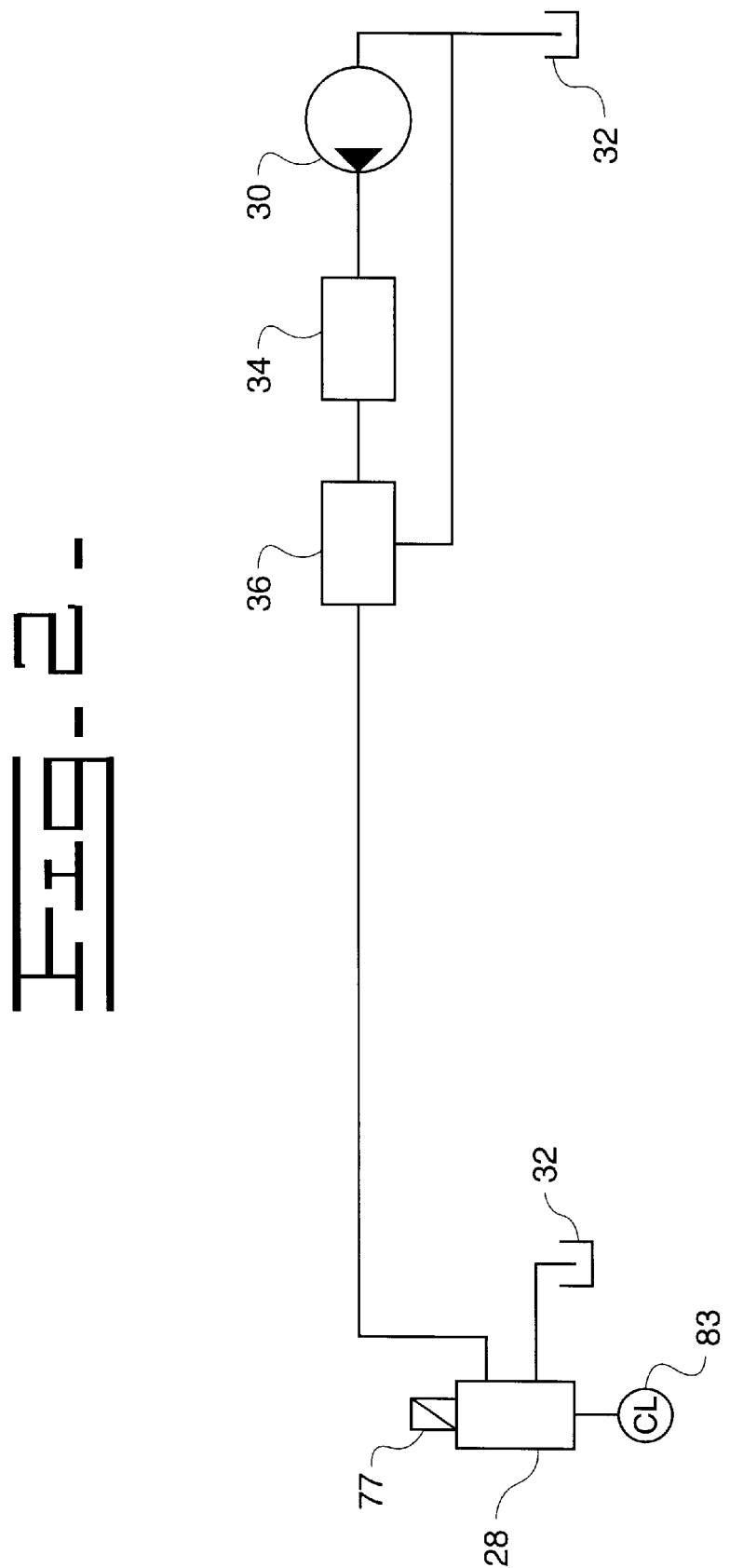
FIG. 2 is a block diagram illustrating an embodiment of a hydraulic system for a fluid actuated clutch.

Referring now to FIG. 2, a block diagram of a hydraulic system for the clutch 83 is shown. As merely an illustrative example, FIG. 2 represents a lock-up clutch that is sometimes referred to as a slipping clutch. The purpose of the lock-up clutch is to provide better machine performance during a load or carry operation. The lock-up-clutch will engage when the torque converter output speed is over a predetermined speed and will disengage when the torque converter output speed is below this predetermined torque converter output speed. When the lock-up clutch is engaged, the torque converter will be bypassed. This will provide a direct connection between the engine and the transmission. The clutch 83 is actuated by hydraulic pressure and upon engagement, requires a requisite amount of fill time before torque is initiated between a friction element that provides a driving force and a friction element that is driven by the friction element having the driving force. In other words, the fill time is the elapsed time between the time that the clutch piston moves from the released to the initial engagement position. The clutch 83 is selectively engaged and disengaged by means of the proportional pressure control valve 28.

The hydraulic circuit of the transmission includes a positive displacement pump 30 that supplies pressurized hydraulic fluid from the sump or reservoir 32, through a filtering unit 34, to the clutch 83 through the control valve 28. optionally, a pressure relief valve 36 may be added to regulate the valve supply pressure. When the clutch 83 disengages, excess hydraulic fluid returns to the sump or reservoir 32. Although a lock-up clutch has been mentioned, the present invention could be directed to torque transmitting types of clutches that are not defined as a type of lock-up clutch.

Figure 3:
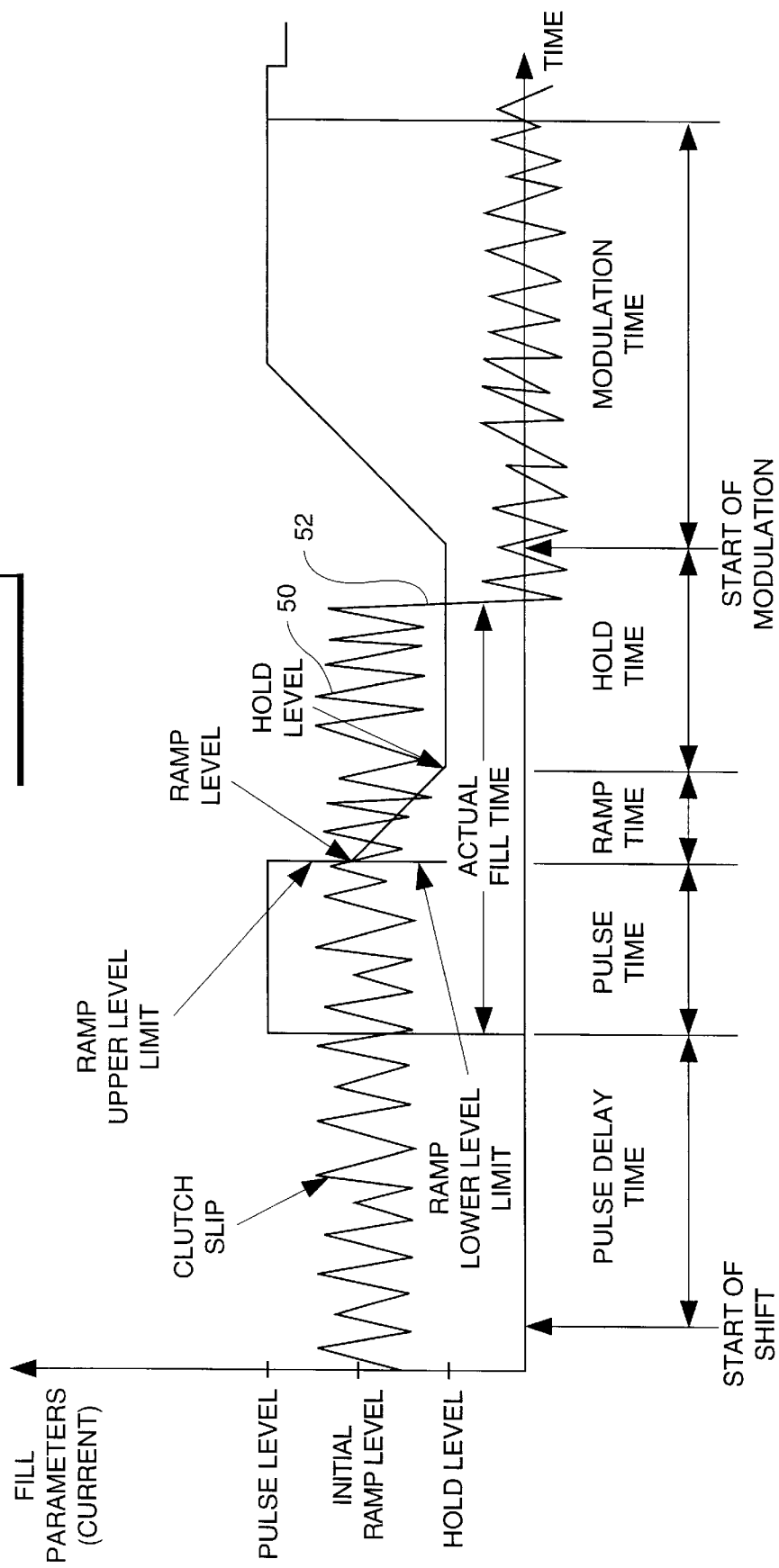
FIG. 3 is a timing chart illustrating the current level during the pulse time, ramp time, hold time, modulation time, and end-of-fill point in correlation with instantaneous clutch slip.

The command pulses utilized to perform a fluid actuated clutch shift are depicted in FIG. 3. Immediately at the start of the clutch shift, there is a small pulse delay time period. The command pulse is pulsed at a relatively high level for a predetermined period of time. This command pulse to the solenoid valve 77 quickly opens the control valve 28 to begin filling the fluid actuated clutch 83 and thereby stroking the respective fluid actuated clutch piston. The fluid actuated clutch command is then decreased from a ramp level during the ramp time to a hold level having a duration sufficient to completely fill the fluid actuated clutch 83. The value of the hold level is high enough to ensure completion of clutch fill and yet low enough to prevent torque spike when the clutch plates "touch up". After the fluid actuated clutch 83 is filled, the clutch pressure enters a modulation time period. This modulation phase can utilize either an open or closed loop control to gradually increase the clutch pressure to cause a desired decrease in clutch slip. The pressure within the clutch 83 is increased to and held at a level sufficient to maintain the clutch 83 in its fully engaged position.

Once again, the crucial point to determine is the end-of-fill. If this point can be ascertained with reasonable certainty, then a smooth transition into the modulation time period can result so that the clutch pressure is slowly and gradually increased with a corresponding decrease in clutch slip. This will prevent the torque spike that causes jerk and creates discomfort to the operator as well as decreasing the life expectancy of the drivetrain components. Either early or late engagement will cause a torque spike. The end-of-fill point occurs during the hold time when pressure on the clutch 83 is the lowest.

Also, as shown in FIG. 3, the instantaneous clutch slip is depicted in correlation with the current level of the fill parameters. When the average of a predetermined number of loops or cycles of instantaneous clutch slip that is divided by a predetermined factor is greater than the instantaneous value of the clutch slip, this point in time will be the end-of-fill. The preferred predetermined factor represents a fixed percentage of the average clutch slip. This percentage typically ranges between thirty percent (30%) and fifty percent (50%) with the optimal value being thirty percent (30%). It is also preferred to use a low pass digital filter software algorithm to provide an average clutch slip value. As illustrated, a first instantaneous clutch slip level 50 presents a marked contrast to a second clutch slip level 52. The instantaneous clutch slip level at 52 will be less than the average value of clutch slip for a predetermined number of loops or cycles that is divided by a predetermined factor so that at this point, the clutch slip indicates the end-of-fill for that clutch. Even a single cycle might suffice. The average clutch slip is preferably computed prior to the initiation of the command pulse. However, computation of the average clutch slip can occur at any time while the clutch slip is at the first instantaneous clutch slip level 50.

As shown, once the clutch 83 reaches the point of "touch-up", the instantaneous clutch slip will remain at this lower level, however, these later clutch slip values are not relevant because the end-of-fill point has already been determined. This predetermined factor varies depending on the design and structure of the respective clutch 83, the type and nature of the machine, the machine manufacturer, the number of cycles, and any software scaling factors. An illustrative, but nonlimiting, example would include a predetermined factor representing thirty (30%) of the average clutch slip or in the alternative, a predetermined factor of three (3) and a predetermined number of cycles or loops as ten (10) could be used for some motor graders, wheel loaders and off-highway trucks.

The end-of-fill detecting software will now be discussed with reference to FIG. 4, which depicts a flowchart representative of the computer program instructions executed by the electronic control module 40 shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. As shown in FIG.

4, the program first determines whether a clutch command is present <60>. If the answer is no, the counter will be set to zero <74> and the process will stop. If the answer is yes, then a counter will be incremented by one (1) <62>. Preferably, the value of the counter is correlated to a value in real time by a timing function associated with the electronic control module 40.

There are four steps, although not critical to the process in principle, which attempt to minimize the possibility of detecting a false end-of-fill point and operate as a safeguard. These four steps are preferably monitored throughout the process or may be monitored once prior to the start of a primary program step.

The first of these steps involves the determination of whether the selected gear is present <64>. This selected gear is totally dependent on the type of engine utilized in a particular machine. An illustrative, but nonlimiting example, is equal or greater than second gear and less than or equal to third gear for motor graders, wheel loaders, and off-highway trucks. If the answer to this query is no, the counter is set to zero <74> and the program stops. Otherwise, the program will progress to the next step.

The second safeguard step is a determination of whether the engine speed exceeds a minimum threshold value <66>. Once again, these limits are dependent on the parameters of the clutch and a failure to be above this minimum threshold will result in the counter being set to zero <74>. An illustrative, but nonlimiting example, is an engine speed of 1,500 revolutions per minute for motor graders, wheel loaders, and off-highway trucks.

The third safeguard step is a determination of whether the torque converter slip is monotonically decreasing by a predetermined value over a predetermined number of cycles <67>. Once again, these limits are dependent on the parameters of the clutch and a failure to decrease over a predetermined number of cycles will result in the counter being set to zero <74>. An illustrative, but nonlimiting example, is a decrease over two or more cycles or loops for motor graders, wheel loaders, and off-highway trucks.

The fourth safeguard step merely compares the value of the counter with a predetermined time interval. A nonlimiting example of this time interval would include a summation of the pulse, ramp, hold, and modulation times <68>. If the value of the counter exceeds the summation of these time periods, the counter will be set to zero <74> and the program will stop. This is because the point in time representing the end of the fill period will have past.

The primary program step makes the determination as to whether or not the instantaneous clutch slip is less than an average of a predetermined number of loops or cycles of clutch slip that is divided by a predetermined factor <68>. As previously described above, this predetermined factor and the number of loops or cycles vary depending on the design and structure of the clutch. The design and structure of the clutch depends upon the type and nature of the machine as well as the machine manufacturer. In addition, the parameters may be altered due to different scaling factors in the software. An illustrative, but nonlimiting, example would include a predetermined factor of three (3) and the number of loops or cycles being ten (10) for motor graders, wheel loaders, and off-highway trucks.

The software will keep looping through this primary program step <70>, the step of incrementing the counter by one (1) <62>, the first safeguard step <64>, the second safeguard step <66>, the third safeguard step <67> and the fourth safeguard step <68>, until this condition is reached and will then save the counter value at this point as the end-of-fill point <72>.

Industrial Applicability

The present invention is advantageously applicable in controlling the shifting of a clutch utilized in conjunction with a torque converter, typically, but not limited to, construction machines such as motor graders, off-highway trucks, wheel loaders, bulldozers, and the like. The following description is only for the purposes of illustration and is not intended to limit the present invention as such. It will be recognizable, by those skilled in the art, that the present invention is suitable for a plurality of other applications.

The present invention detects a marked decrease in the instantaneous value of the clutch slip as the end-of-fill point or end-of-fill time. This determination occurs when the instantaneous clutch slip is less than an average of a predetermined number of loops or cycles of clutch slip that is divided by a predetermined factor. The fill time is defined as the time required to fill an on-coming clutch cavity with fluid. During this fill period, the clutch piston will stroke and the clutch plates touch-up. However, until the clutch plates are initially compressed, the clutch 83 cannot transmit any torque. Therefore, the end-of-fill time is important in order to ascertain when this critical moment is reached. The present invention can eliminate both early engagement and late engagement. Early or late engagement can result in a torque spike that is transmitted through the drivetrain 10 of the machine and creates a "jerk". The elimination of jerk will make the operator more comfortable and increase the life expectancy of the associated components located within the drivetrain of the machine. Elimination of late engagement pressure will prevent even greater amounts of jerk than early engagement.

In view of the foregoing, it is readily apparent that the subject end-of-fill detection method provides a determination of end-of-fill in a very simple and effective manner that results in a high quality engagement of a fluid actuated clutch.

Other aspects, objects and advantages of the present invention can be obtained from a study of the drawings, the disclosure and the appended claims.

We claim:

1. A system for detecting an end-of-fill condition for a fluid actuated clutch comprising:

a fluid actuated clutch;

an input mechanism that generates a signal, including a value for an input speed of said fluid actuated clutch and a value of output speed for said fluid actuated clutch;

an electronic controller for detecting an instantaneous clutch slip, which is a difference between said input speed of said fluid actuated clutch and said output speed of said fluid actuated clutch and detecting when said instantaneous clutch slip is less than an average of a predetermined number of cycles of instantaneous clutch slip that is divided by a predetermined factor, where this condition represents the end-of-fill point for said fluid actuated clutch; and a control valve that is activated by said electronic controller and said control valve is operatively connected to said fluid actuated clutch.

2. The system of claim 1, wherein said average of a predetermined number of cycles of instantaneous clutch slip is determined by a digital low pass filter.

3. The system of claim 1, wherein said predetermined factor is a fixed percentage of said average of a predetermined number of cycles of instantaneous clutch slip.

4. The system of claim 1, wherein said electronic controller determines if a preselected gear is engaged.

5. The system of claim 1, wherein said electronic controller determines if said speed of said engine drive exceeds a predetermined minimum value.

6. The system of claim 1, wherein said electronic controller determines if said end-of-fill point does not exceed a predetermined time period.

7. The system of claim 1, wherein said electronic controller determines if said end-of-fill point does not exceed a summation of pulse time, ramp time, hold time, and modulation times.

8. The system of claim 1, wherein said electronic controller determines if said instantaneous clutch slip does decrease over a plurality of cycles.

9. The system of claim 1, wherein said fluid actuated clutch is a lock-up clutch and said input mechanism generates a signal, including a value for speed of an engine drive and a value of output speed for a torque converter and said instantaneous clutch slip is a difference between said speed of said engine drive and said output speed of said torque converter.

10. The system of claim 9, wherein said electronic controller determines if said end-of-fill point does not exceed a predetermined time period.

11. A method for detecting an end-of-fill condition for a fluid actuated clutch, which is operatively connected to a control valve that is activated by an electronic controller that also receives a signal from an input mechanism, including a value for an input speed of said fluid actuated clutch and a value of output speed for said fluid actuated clutch, the method comprising the steps of:

detecting an instantaneous clutch slip, which is a difference between said input speed of said fluid actuated clutch and said output speed of said fluid actuated clutch; and detecting when said instantaneous clutch slip is less than an average of a predetermined number of cycles of instantaneous clutch slip that is divided by a predetermined factor, where this condition represents the end-of-fill point for said fluid actuated clutch.

12. The method of claim 11, wherein said step of detecting when said instantaneous clutch slip is less than an average of a predetermined number of cycles of instantaneous clutch slip that is divided by a predetermined factor includes determining said average of a predetermined number of cycles of instantaneous clutch slip with a digital low pass filter.

13. The method of claim 11, wherein said step of detecting when said instantaneous clutch slip is less than an average of a predetermined number of cycles of instantaneous clutch slip that is divided by a predetermined factor includes determining said predetermined factor as a fixed percentage of said instantaneous clutch slip.

14. The method of claim 11, wherein said step of detecting an instantaneous clutch slip includes the step of determining if a preselected gear is engaged.

15. The method of claim 11, wherein said step of detecting an instantaneous clutch slip includes the step of determining if said speed of said engine drive exceeds a predetermined minimum value.

16. The method of claim 11, wherein said step of detecting when said instantaneous clutch slip is less than an average includes the step of determining if said end-of-fill point does not exceed a predetermined time period.

17. The method of claim 11, wherein said step of detecting when said instantaneous clutch slip is less than an average includes the step of determining if said end-of-fill point does not exceed a summation of pulse time, ramp time, hold time, and modulation times.

18. The method of claim 11, wherein said step of detecting when said instantaneous clutch slip is less than an average includes the step of determining if said instantaneous clutch slip does decrease over a plurality of cycles.

19. The method of claim 11, wherein said fluid actuated clutch is a lock-up clutch and said input mechanism generates a signal, including a value for speed of an engine drive and a value of output speed for a torque converter and said instantaneous clutch slip is a difference between said speed of said engine drive and said output speed of said torque converter.

20. The method of claim 19, wherein said step of detecting an instantaneous clutch slip includes the step of determining if said speed of said engine drive exceeds a predetermined minimum value.

* * * * *